United States Patent Office 3,531,467
Patented Sept. 29, 1970

---

3,531,467
PROCESS FOR THE PREPARATION OF 2,3,4,5-TETRAHYDRO - 5 - ARYL - 1H - 1,4 - BENZO-DIAZEPINE DERIVATIVES
Giles A. Archer, Essex Fells, and Leo Henryk Sternbach, Upper Montclair, N.J., assignors to Hoffmann-La Roche Inc., Nutley, N.J., a corporation of New Jersey
No Drawing. Filed Dec. 23, 1966, Ser. No. 604,201
Int. Cl. C07d 53/06
U.S. Cl. 260—239          1 Claim

ABSTRACT OF THE DISCLOSURE

Process for the preparation of 2,3,4,5-tetrahydro-5-aryl-1H-1,4-benzodiazepine derivatives comprising intramolecularly condensing the corresponding glycine compounds to form benzodiazepin-3-one derivatives and reducing the keto group of said compounds to obtain the tetrahydro derivatives. The 2,3,4,5-tetrahydro-5-aryl-1H-1,4-benzodiazepine derivatives are useful as anti-convulsant agents.

RELATED CASE

This application is a division of application Ser. No. 400,891 filed Oct. 1, 1964, now U.S. Pat. No. 3,317,518 issued May 2, 1967.

This invention relates to novel benzodiazepine compounds, their preparation and novel intermediates therefor. More particularly, this invention relates to novel 5-aryl-1,2,4,5-tetrahydrobenzodiazepin-3-one compounds. The novel benzodiazepine compounds of this invention are selected from the group of compounds of the formula

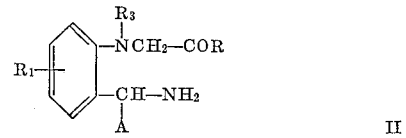

wherein $R_1$ represents a member selected from the group consisting of hydrogen, halogen, trifluoromethyl, lower alkyl and lower alkoxy; $R_3$ represents a member selected from the group consisting of hydrogen and lower alkyl and A represents a member selected from the group consisting of pyridyl, unsubstituted phenyl or phenyl substituted by halogen, trifluoromethyl, lower alkyl or lower alkoxy.

More specifically, the novel benzodiazepines of this invention can be represented by the formulae:

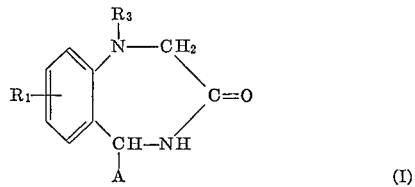

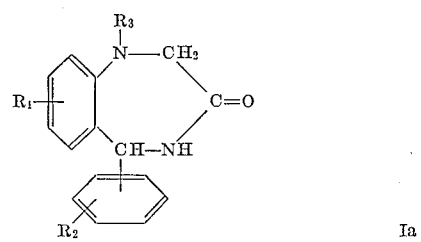

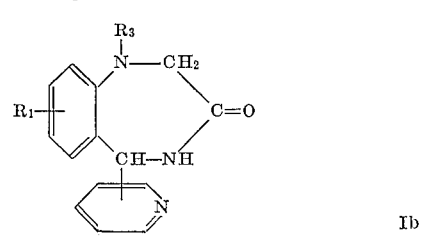

wherein $R_1$ and $R_2$ are each selected from the group consisting of hydrogen, halogen, trifluoromethyl, lower alkyl and lower alkoxy, and $R_3$ is hydrogen or lower alkyl.

Compounds of Formula Ia wherein $R_1$ is in the 7-position constitute a preferred group.

The novel compounds of Formula I are prepared by intramolecularly condensing a compound of the formula:

$$\underset{\text{II}}{R_1\!\!-\!\!\overset{\displaystyle R_3}{\underset{\displaystyle A}{\underset{|}{\bigcirc}\!\!-\!\!NCH_2\!\!-\!\!COR}\!\!-\!\!CH\!\!-\!\!NH_2}}$$

wherein $R_1$, $R_3$ and A have the same meaning as above and R is selected from the group consisting of hydroxy, lower alkoxy, aryloxy and amino.

As used in this application, the term "lower alkyl" refers to both straight and branched chain lower hydrocarbon radicals such as methyl, ethyl, propyl, isopropyl and the like. The term "halogen" comprehends all four halogens, viz. iodine, bromine, fluorine and chlorine (the latter three being preferred). "Lower alkoxy" comprehends ether radicals wherein the lower alkyl moiety is the same as defined for lower alkyl above, for example, methoxy, ethoxy, etc. "Amino" comprehends unsubstituted and substituted amino groups such as —$NH_2$, —NH(lower alkyl) and —N(lower alkyl)$_2$. "Aryloxy" comprehends ether radicals bearing an aromatic hydrocarbon group, or example, phenoxy and the like.

The novel benzodiazepine compounds of this invention conforming to Formula I above have valuable medicinal properties. More particularly, they are useful as anti-convulsants. They are especially useful as anti-convulsants since they give rise to a minimum of side effects. Especially preferred are the compounds of Formula I above wherein $R_1$ is chloro and is in the 7-position.

In general, the compounds can be formulated with conventional inert adjuvants into dosage forms suitable for oral or parenteral administration. Such dosage forms include tablets, capsules, suppositories, injectable solutions, suspensions and the like. They can be taken internally, for example, orally or parenterally. The frequency of administration is variable depending upon the needs and requirements of the patient.

As stated above, compounds of Formula I can be prepared via intramolecular condensation of compounds of Formula II. The compounds of Formula II, depending upon the meaning of R, are either amino acetic acids, amino acetates (i.e., esters) or amino acetamides. While the intramolecular condensation can be effected with any of these, it is preferred to effect the intramolecular condensation utilizing the compounds of Formula II which are amino acetic acids (i.e., R is hydroxy). In such instances, the intramolecular condensation constitutes a dehydration. The intramolecular condensation can be suitably effected by heating a compound of Formula II in an inert organic solvent. The dehydration embodiment (i.e., where R is hydroxy) constitutes a specific exemplification of the intramolecular condensation. This dehydration can be effected by any suitable means but preferably is effected by heating in an inert organic solvent. The temperature of the heating can vary over a wide range but it is preferred to operate at a temperature in the range of about 25° C. to about 300° C. with a temperature range of about 80° C. to about 200° C. being especially preferred. Representative organic solvents which are useful in this aspect of the invention are hydrocarbons, for example, aromatic hydrocarbons, such as xylene and the like, halogen-containing hydrocarbons such as ethylene dichloride and the like, ethers, such as dioxane, ethers of ethylene glycol, tetrahydrofuran, diisobutyl ether and the like, and basic nitrogen-containing heterocyclic solvents such as pyridine, piperidine and the like. Mixtures of inert organic solvents can also be used.

The intramolecular condensation of compounds of Formula II which are esters of amides, i.e., where R is lower alkoxy, aryloxy or amino, can be effected in several ways. The ester and amides of Formula II can be cyclized to form the corresponding Formula I compounds. Cyclization of the esters or the amides of Formula II is suitably effected by heating the appropriate ester or amide in a heterocyclic solvent such as pyridine and preferably in the presence of a catalyst such as pyridine hydrochloride. Alternatively, the esters and amides of Formula II can be hydrolyzed to the corresponding amino acetic acids which are the preferred starting materials for the intramolecular condensation.

The hydrolysis of the amino acetate ester or amino acetamide of Formula II to the corresponding acid is suitably effected via either acid or alkaline hydrolysis and can be effected at either room temperature or above or below room temperature. Preferably, it is effected at above room temperature by refluxing the appropriate ester or the amide in an acidic or basic aqueous medium.

Compounds corresponding to Formula II above are novel compounds which also form part of this invention. They may be synthesized by converting an N-(2-aroylphenyl)glycine derivative to its oxime with hydroxylamine and, in a next step, reducing the oxime to form the corresponding Formula II compound.

The oxime intermediates of this invention are of the formula:

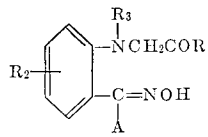

III wherein R, $R_1$, $R_3$ and A have the same significance as above.

The oximes of Formula III are prepared by treating an N-(2-aroylphenyl)glycine of the formula:

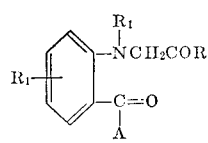

IV wherein the symbol R represents hydroxy, lower alkoxy, aryloxy and amino; $R_1$ represents hydrogen, halogen, trifluoromethyl, nitro, amino, cyano, lower alkyl or lower alkoxy; $R_3$ represents hydrogen or lower alkyl; and the symbol A represents pyridyl, unsubstituted phenyl or phenyl substituted by halogen, trifluoromethyl, lower alkyl or lower alkoxy with hydroxylamine or a salt of hydroxylamine such as hydroxylamine hydrochloride in an organic solvent. Any organic solvent which is inert under the reaction conditions employed can be used. However, it is preferred to use a basic nitrogen-containing solvent such as pyridine. While the reaction temperature is not critical in this step of the process, it has been found convenient to operate at an elevated temperature. An especially suitable temperature is the reflux temperature of the reaction mixture.

Reduction of the oxime to the corresponding compounds of Formula II can be accomplished either chemically or catalytically such as, for example, by treating with zinc and aqueous alcoholic ammonia or by the catalytic addition of hydrogen, for example, with a nickel catalyst or a palladium/charcoal catalyst.

The compounds of Formula IV above, are prepared by a variety of methods. They can be prepared, for example, from known compounds of the formula:

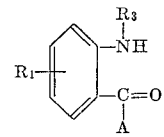

Va wherein the symbols $R_1$, $R_3$ and A have the same significance as above.

Representative compounds meeting this description which can be suitably used as starting materials in this aspect of the invention are, for example, 2-amino-5-chlorobenzophenone, 2-amino-5-methylbenzophenone, 2-amino-5-nitrobenzophenone, 2 - amino-5-trifluoromethylbenzophenone, 2-amino - 5 - nitro-2'-fluorobenzophenone, 2-amino-5,2'-dichlorobenzophenone, 2-amino - 5 - chloro-2'-fluorobenzophenone, 2-amino - 2' - fluorobenzophenone, (2-aminobenzoyl)pyridine and (2-amino-5-chlorobenzoyl)pyridine.

The novel compounds of Formula IV are prepared from compounds of Formula Va by treating the appropriate Formula Va compound with an alkylating agent. The reaction is suitably carried out in an inert organic solvent such as lower aliphatic alcohol, dioxan, tetrahydrofuran and the like. The reaction can be carried out over a wide range of temperatures; however, it is preferred to operate at an elevated temperature. A suitable reaction temperature is the reflux temperature of the reaction mixture. Suitable alkylating agents for use in this process are, for example, the haloacetic acids, haloacetic acid esters and haloacetamides which can be represented by the formula:

$$XCH_2COR \qquad VI$$

wherein X represents halogen, i.e., bromine, chlorine, iodine and fluorine and R is hydroxy, lower alkoxy, aryloxy or amino.

Representative alkylating agents are, for example, bromoacetic acid, ethylbromoacetate and bromoacetamides such as α-bromoacetamide, N-lower alkyl α-bromoacetamide and N,N-di-lower alkyl-α-bromoacetamide. Halo derivatives of the named compounds other than bromo can also be used; it is preferred, however, to use the bromo or chloro derivatives.

Alternatively, the compounds of Formula IV can be prepared by initially treating a known compound of the formula:

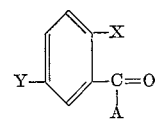

Vb wherein Y is $NO_2$ or trifluoromethyl and wherein A and X have the same significance as above with a compound of the formula:

$$R_3NHCH_2COR \qquad VII$$

wherein R and $R_3$ has the same significance as above.

Compounds answering to the above description of Formula VII compounds are, for example, glycine, the lower alkyl esters of glycine such as glycine ethyl ester, etc., and glycine amides, i.e., the primary, secondary and tertiary amides of glycine.

The reaction of the Formula Vb compound with a compound of Formula VII is preferably carried out in an inert organic solvent at an elevated temperature. Suitable solvents are, for example, dimethylformamide, alcohols such as n-butanol, ethers such as dioxane or inert organic bases such as pyridine, morpholine or quinoline and the like. It is preferred to carry out the reaction at an elevated temperature such as, for example, a temperature between about room temperature and the reflux temperature of the reaction mixture. It can, however, if desired, be carried out at room temperature or below. A convenient temperature at which to carry out the reaction is the reflux temperature of the reaction mixture.

In the next step, the substituent denoted as $R_1$ in Formula IV can be obtained as other than $NO_2$ or trifluoromethyl by replacement of the $NO_2$ group in the 5-position of the compound obtained as the reaction product of the reaction of a Formula VII compound with a compound of Formula Vb in which Y represents nitro. Thus, for example, the nitro group can be reduced to amino and such amino group can be further replaced by other groups such as hydrogen, halogen, cyano, hydroxy, and the like by replacement reactions which are known per se, such as, for example, Sandmeyer-type replacements.

As indicated above, substituents $R_1$ and $R_2$ can be introduced into either or both the aryl rings before the heterocyclic nucleus conforming to Formula I above is formed, i.e., on any of the various intermediate compounds or after the heterocyclic compound of Formula I has been formed. Additionally, compounds of Formula I or any of the various intermediates of Formulas II, III and IV which have a primary or a secondary amino group can obviously be acylated or alkylated by known techniques. Those compounds containing a lactam group can likewise be N-alkylated by known methods. All compounds of Formulas I, II, III or IV which have a basic nitrogen group can be converted to the corresponding acid addition salts. Pharmaceutically acceptable salts are made from pharmaceutically acceptable organic or inorganic acids such as, for example, hydrohalic acids, e.g., hydrochloric and hydrobromic, maleic acid, citric acid and the like.

The compounds of Formula I can, if desired, be reduced to a 2,3,4,5-tetrahydro-5-aryl-1H-1,4-benzodiazepine compound of the formula:

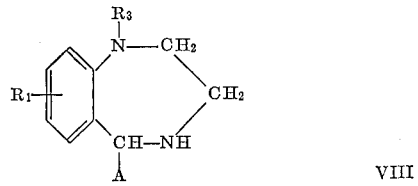

VIII wherein $R_1$ and A have the same significance as above. The compounds of Formula VIII are known pharmacologically useful compound. The reduction of the compounds of Formula I is effected by known reducing methods such as with lithium aluminum hydride under anhydrous conditions. The reaction is conveniently carried out in an organic solvent at an elevated temperature. A suitable temperature is the reflux temperature of the reaction mixture. Upon completion of the reaction, the product is worked up in the usual manner as will be more fully illustrated by the examples given hereinafter.

From the above description, it will be readily appreciated that this invention comprises a novel process for the preparation of 2,3,4,5-tetrahydro-5-aryl-1H-1,4-benzodiazepines. Hence, the compounds of this invention are also useful as intermediates in the synthesis of such known benzodiazepines.

The following examples serve to illustrate the invention. All temperatures are in degrees centigrade and all melting points are corrected.

EXAMPLE 1

A mixture of 23.1 g. (0.1 mole) of 2-amino-5-chlorobenzophenone, 150 cc. of ethanol and 10.6 g. (0.1 mole) of sodium carbonate was stirred and heated to reflux. Ethyl bromoacetate (10.1 cc., 16.7 g., 0.1 mole) was added dropwise over 10 minutes and the reaction mixture was then stirred and refluxed for 30 hours. The hot mixture was filtered through a pad of "Hyflo" and the filtrate was evaporated in vacuo. The residue was recrystallized twice from 100 cc. of ethanol to give N-(2-benzoyl-4-chlorophenyl)glycine ethyl ester, melting at 103–105°. The pure substance recrystallized from ethanol, melted at 104–106°.

EXAMPLE 2

A solution of 2-chloro-5-nitrobenzophenone (52 gm., 200 millimoles) and glycine ethyl ester (41 gm., 400 millimoles) in anhydrous pyridine (50 ml.), was stirred and refluxed for 4 hours. A further quantity of glycine ethyl ester (21 gm.) was added, and refluxing was continued for another 6 hours, after which the mixture was concentrated in vacuo, and poured into water. Excess sodium hydroxide solution was added, and the mixture was extracted with methylene chloride. The extract was washed, dried ($Na_2SO_4$) and evaporated. The residue was dissolved in a small volume of methanol, and this solution was added slowly to well stirred ice-cold 1 N hydrochloric acid (450 ml.), and was then stirred for 17 hours at 25° C. The mixture was concentrated in vacuo at 25° C. to remove most of the methanol, and was then cooled, and made basic with dilute sodium hydroxide solution, followed by extraction with methylene chloride. Evaporation of the washed and dried ($Na_2SO_4$) extract gave the crude product as an oil. This was purified by filtration of a benzene solution through a short column containing 260 gm. "Woelm" activity III neutral alumina. Evaporation of the benzene eluates, and recrystallization of the residue from methylene chloride-hexane, gave N-(2-benzoyl-4-nitrophenyl)glycine ethyl ester as yellow crystals, melting at 124–127° C. The analysis sample was further recrystallized from methyl chloride-hexane, and obtained as yellow needles, melting at 128–130° C.

EXAMPLE 3

A solution of N-(2-benzoyl-4-chlorophenyl)glycine ethyl ester (95.4 gm., 0.300 mole), in anhydrous pyridine (500 ml.) was treated with hydroxylamine hydrochloride (23.1 gm., 0.330 mole) and stirred and refluxed for 20 hours. Then about 200–250 ml. of the pyridine was distilled off through a short vigreux column during 3–4 hours and finally the mixture was concentrated in vacuo to a small volume. The concentrate was poured into 10–20 volumes of water, and stirred until the resulting precipitate was entirely crystalline. The crude product was filtered off, washed with water and recrystallized from aqueous ethanol, giving yellow crystals of N-(2-benzoyl-4-chlorophenyl)glycine ethyl ester oxime, melting at 110–115° C. Recrystallization from benzene-hexane gave the nearly pure product as cream-colored prisms, melting at 132–134° C.

EXAMPLE 4

A solution of N-(2-benzoyl-4-chlorophenyl)glycine ethyl ester oxime (3.327 gm., 10 millimoles) in a mixture of ethanol (200 ml.) and water (50 ml.) was warmed in a water-bath at 55–60° C., and titrated with 0.1 N sodium hydroxide solution (phenolphthalein indicator), allowing the reddish color of the solution to be discharged in between each addition of alkali. The calculated volume of sodium hydroxide solution (100 ml. of 0.1 N) was consumed in 5–6 hours. The solution was concentrated in vacuo to about 100 ml., filtered and acidified with dilute acetic acid. The crude product was extracted with methylene chloride, and obtained as a yellow gum. Recrystallization from methylene chloride-hexane gave cream-colored prisms of N-(2-benzoyl-4-chlorophenyl)glycine oxime, melting at 160–163° C. Further recrystallization from methanol-methylene chloride-hexane, and from aqueous ethanol gave colorless needles, melting at 165–168° C.

EXAMPLE 5

To N-(2-benzoyl-4-chlorophenyl)glycine ethyl ester oxime (83.2 gm., 0.25 mole) in methanol (2 l.), was added a suspension of 10 percent palladium-on-charcoal catalyst (12.5 gm.) in 6 N hydrochloric acid (100 ml.). The mixture was hydrogenated at room temperature and atmoshydrogen (6.5 hours) reduction was stopped, the catalyst was filtered off on a bed of "Hy-flo" and washed with methanol. The filtrates were evaporated in vacuo at <30° C. and the resulting residue was partitioned between water (strongly acid due to excess HCl present) and ether. The aqueous acid layer was cooled, made basic with sodium hydroxide solution and extracted with methylene chloride to give N-[2-(...)phenyl]glycine ethyl...

(60 ml.), was treated with pyridine hydrochloride (1.16 gm., 10 millimoles) and finely powdered "Drierite" (1.36 gm., 10 millimoles). The mixture was stirred fluxed for 18 hours, with protection moisture. The solvent the resid sulting precipitated product was filtered off, washed with water and recrystallized from acetonitrile to give yellow crystals of N-(2-benzoyl-4-chlorophenyl)glycine melting at 179–182° C.

EXAMPLE 13

A mixture of 2-chloro-5-nitrobenzophenone (52 gm., 0.2 mol.), sarcosine (20 gm., 0.22 mol.), ethanol (250 ml.) and triethylamine (29 ml., 40.5 gm., 0.4 mol.) was stirred and refluxed for 27 hours. The mixture was then evaporated in vacuo and the residue was partitioned between dilute sodium hydroxide solution and ether. Some undissolved material was filtered off and the two layers of the filtrate were separated. The precipitate was combined with the aqueous layer and the mixture was acidified with 3 N acetic acid (to pH about 4). The resulting precipitated product was filtered off, washed with a little water and dried in vacuo. Recrystallization from acetone-hexane gave yellow prisms of N-(2-benzoyl-4-nitrophenyl)-N-methylglycine melting at 161–163°.

EXAMPLE 14

A mixture of N-(2-benzoyl-4-nitrophenyl)glycine ethyl ester (30.0 gm., 91.4 mm.) and hydroxylamine hydrochloride (6.95 gm., 100 mm.) in anhydrous pyridine (150 ml.) was stirred and refluxed for 21 hours. The solution was then concentrated by slow distillation through a short Vigreux column until about 100-110 ml. of distillate had been collected. The concentrated solution was then poured into ice-water (500 ml.) and the resulting precipitated product was filtered off and washed with water. Recrystallization from methanol gave N-(2-benzoyl-4-nitrophenyl) glycine ethyl ester oxime melting at 167–169°. Further recrystallizations from methylene chloride-hexane gave yellow prisms of the product which melted at 173–175°.

We claim:

1. A method for the preparation of compounds of the formula:

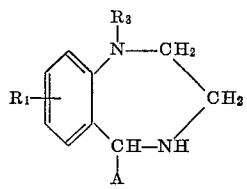

wherein $R_1$ represents a member selected from the group consisting of hydrogen, halogen, trifluoromethyl, lower alkyl and lower alkoxy; $R_3$ represents a member selected from the proup consisting of hydrogen and lower alkyl; and A represents a member selected from the group consisting of pyridyl, unsubstituted phenyl and phenyl substituted by a member selected from the group consisting of halogen, trifluoromethyl, lower alkyl and lower alkoxy which comprises treating a compound of the formula:

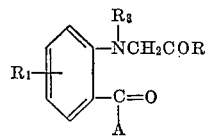

wherein $R_1$, $R_3$ and A have the same significance as above; and R represents a compound selected form the group consisting of hydroxy, lower alkoxy, aryloxy and amino with hydroxylamine of form an oxime have the formula:

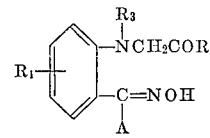

wherein $R_1$, $R_3$, A and R have the same significance as above and thereafter intramolecularly condensing said glycine to convert the oxime to the corresponding glycine compound of the formula

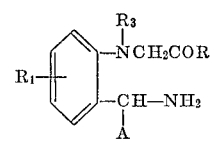

wherein R, $R_1$, $R_3$ and A have the same significance as above and thereafter intramolecularly condensing said glycine compound by heating in an inert organic solvent to form a benzodiazepin-3-one of the formula

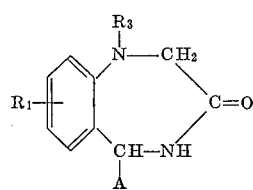

wherein R, $R_1$, $R_3$ and A have the same significance as above and reducing the keto group of said benzodiazepin-3-one by treating the compound with a reducing agent.

References Cited

UNITED STATES PATENTS 3,109,843    5/1963    Reeder et al. _____ 260—239
3,374,264    3/1968    Uskokovic et al. _____ 260—239

OTHER REFERENCES

Elderfield, "Heterocyclic Compounds," vol. 6 (New York, 1957), p. 464.

Wagner et al., "Synthetic Organic Chemistry," (New York, 1953), pp. 658, 739.

Winans et al., J. Am. Chem. Soc., vol. 55, pp. 2051–2058 (1933).

ALTON D. ROLLINS, Primary Examiner

U.S. Cl. X.R.

260—294.9, 295, 296, 465, 471, 487, 558, 559, 561, 566, 570; 424—244, 263

PO-1050
(5/69)

UNITED STATES PATENT OFFICE
CERTIFICATE OF CORRECTION

Patent No. 3,531,467     Dated September 29, 1970

Inventor(s) Archer and Sternbach

It is certified that error appears in the above-identified patent and that said Letters Patent are hereby corrected as shown below:

Column 10, claim 1, line 4

"an oxime have the formula:"

should be an oxime having the formula

Column 10, claim 1, lines 14-16

"and thereafter intramolecularly condensing said glycine"

should be and thereafter treating the oxime with a reducing agent.

SIGNED AND
SEALED
DEC 29 1970

(SEAL)
Attest:

Edward M. Fletcher, Jr.
Attesting Officer

WILLIAM E. SCHUYLER, JR.
Commissioner of Patents